United States Patent [19]

Angelbeck

[11] Patent Number: 4,740,146
[45] Date of Patent: Apr. 26, 1988

[54] APPARATUS FOR MEASURING AND CONTROLLING THE WALL THICKNESS OF PLASTIC PIPES

[76] Inventor: Peter Angelbeck, 555 W. Middlefield Rd., Suite B-203, Mountain View, Calif. 94043

[21] Appl. No.: 889,172

[22] Filed: Jul. 25, 1986

[51] Int. Cl.⁴ .............................................. B29C 47/92
[52] U.S. Cl. ......................................... 425/71; 73/622; 264/23; 264/40.7; 425/141; 425/174.2
[58] Field of Search ..................... 425/141, 71; 264/23, 264/40.1, 40.2, 40.7; 73/622

[56] References Cited

U.S. PATENT DOCUMENTS

| | | | |
|---|---|---|---|
| 3,827,287 | 8/1974 | Boggs et al. | 73/622 X |
| 3,856,595 | 12/1974 | Skobel | 425/141 X |
| 3,916,676 | 11/1975 | Boggs et al. | 73/622 X |
| 3,922,328 | 11/1975 | Johnson | 425/141 X |
| 4,052,887 | 10/1977 | Sheridan et al. | 73/622 X |
| 4,089,227 | 5/1978 | Falgari et al. | 73/622 |
| 4,114,456 | 9/1978 | Dory | 73/622 |
| 4,137,025 | 1/1979 | Graves et al. | 425/71 |
| 4,152,380 | 5/1979 | Graves et al. | 264/23 |
| 4,157,503 | 6/1979 | Brunner | 425/141 X |
| 4,472,975 | 9/1984 | Beck et al. | 73/622 X |
| 4,487,072 | 12/1984 | Livingston | 73/622 |
| 4,520,672 | 6/1985 | Saint-Amour | 73/622 |
| 4,559,825 | 12/1985 | Martens | 73/622 |

FOREIGN PATENT DOCUMENTS 1370946 10/1974 United Kingdom .................. 73/622

OTHER PUBLICATIONS

Advertising Literature by Buhl Automatic on IMP-30-00-.
Advertising Literatury by Panametrics on 5215 Series, May, 1984.
Advertising Literature by A. Krautkramer Branson Company on WDM-U, Jan., 1985.
Advertising Literature by LFE Corporation on the LFE System 535, Bulletin 5531–5132, Jun. 1979.

Primary Examiner—Richard L. Chiesa
Attorney, Agent, or Firm—Jack M. Wiseman

[57] ABSTRACT

Apparatus for producing plastic pipes by an extrusion process in which the wall thickness of the plastic pipe is controlled by the takeaway speed at which a soft plastic pipe is removed from a metal sizing sleeve. To measure the wall thickness of the soft plastic pipe advancing through the sizing sleeve for regulating the takeaway speed, a transducer emits ultrasonic sound through a plastic transmission line mounted in or on the sizing sleeve and interposed between the transducer and the plastic pipe. The time interval between the emission of a sonic pulse by the transducer and the detection of a reflected sonic pulse from the inner wall of the advancing soft plastic pipe is a function of the wall thickness of the plastic pipe in a soft plastic state.

26 Claims, 4 Drawing Sheets

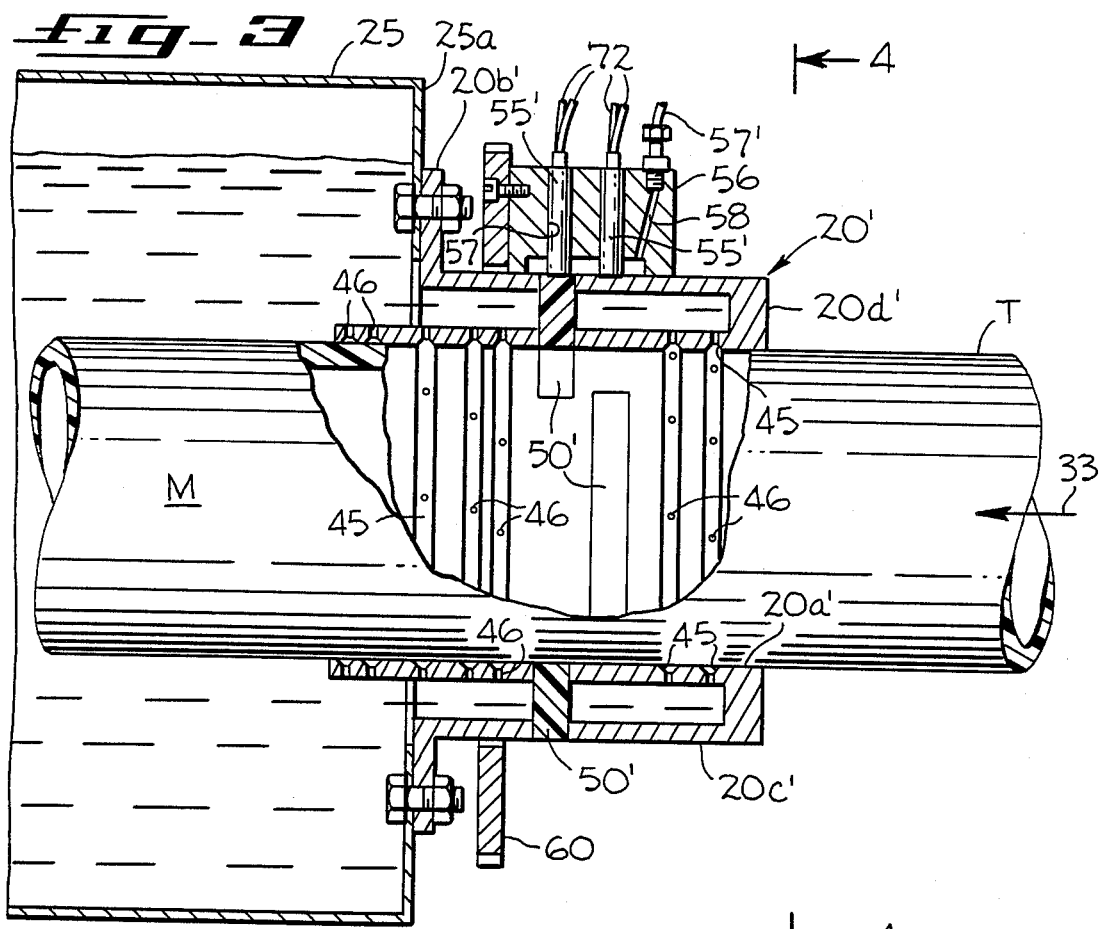
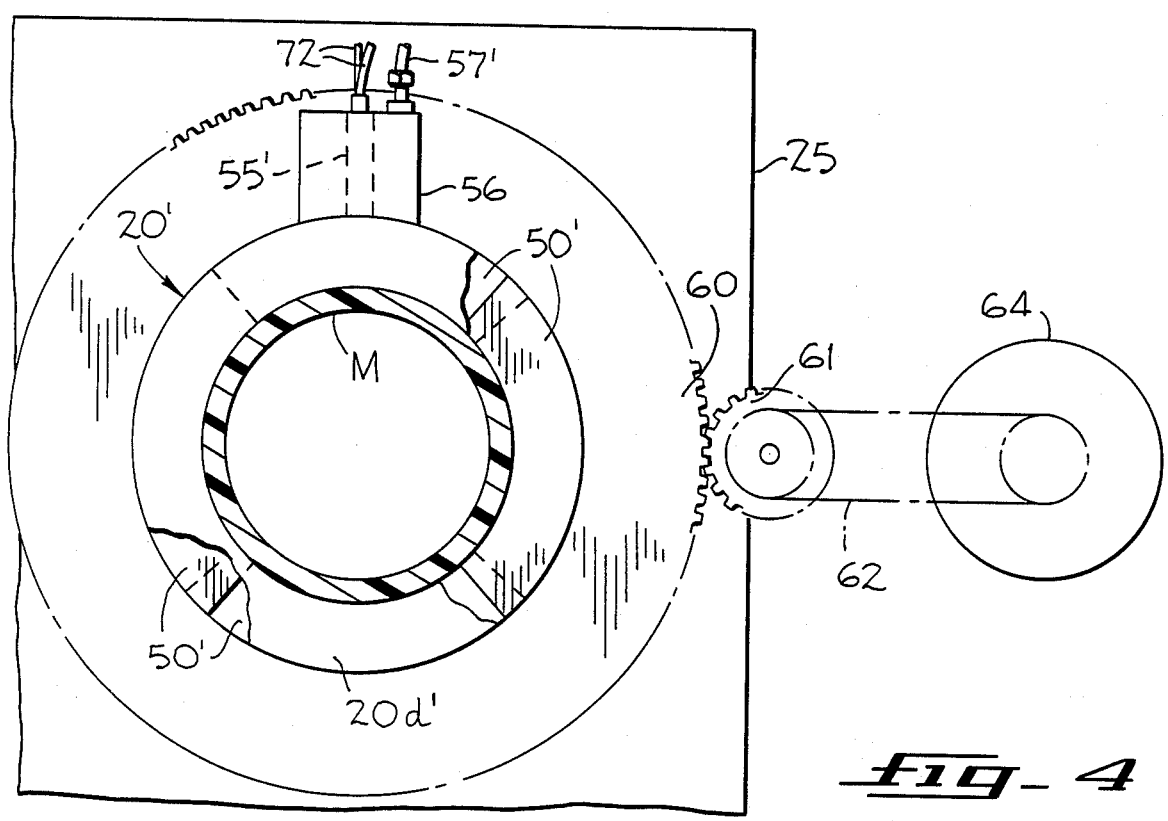

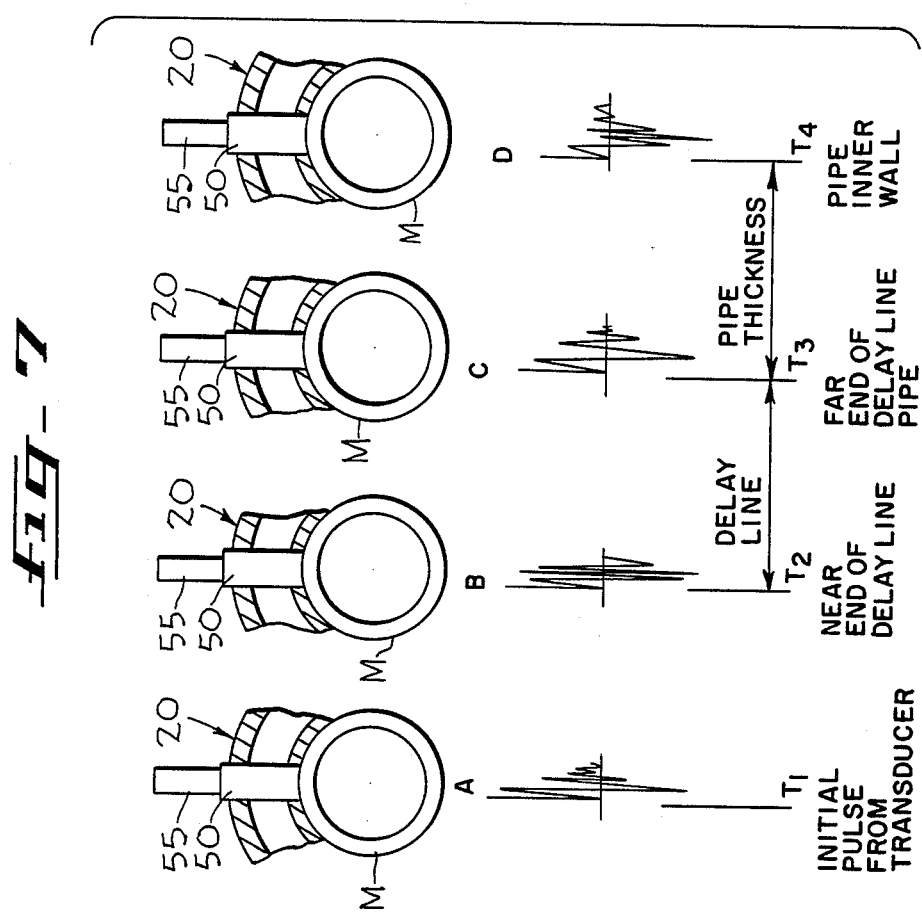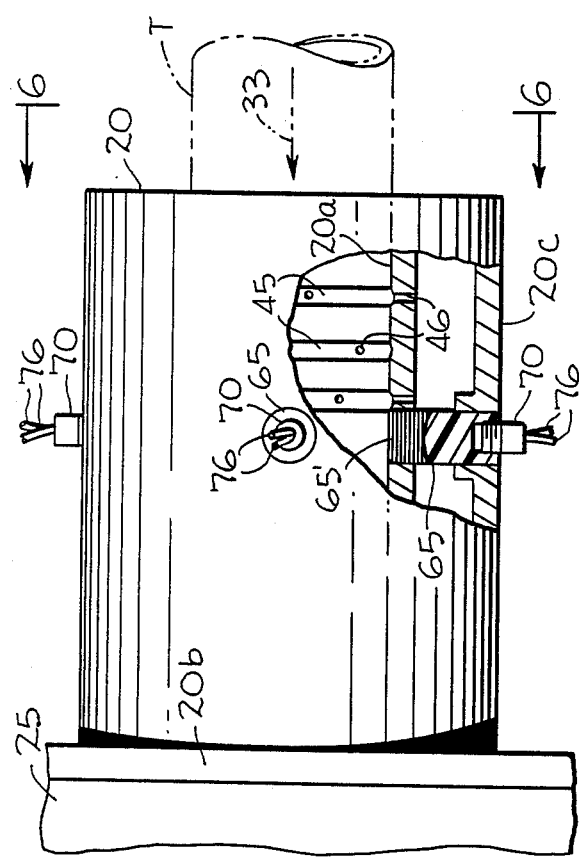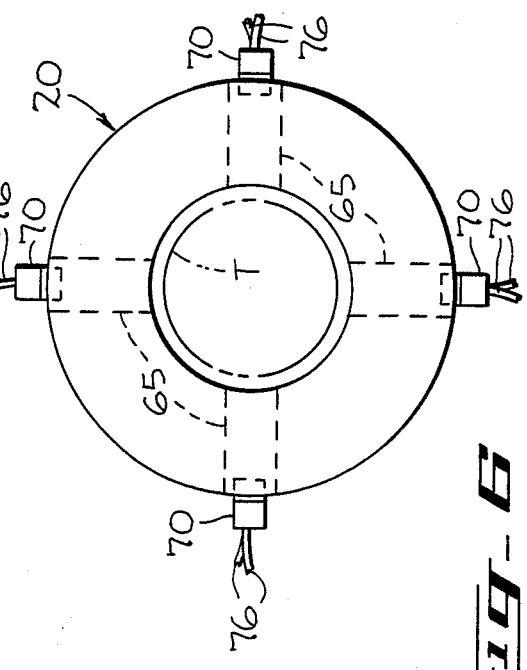

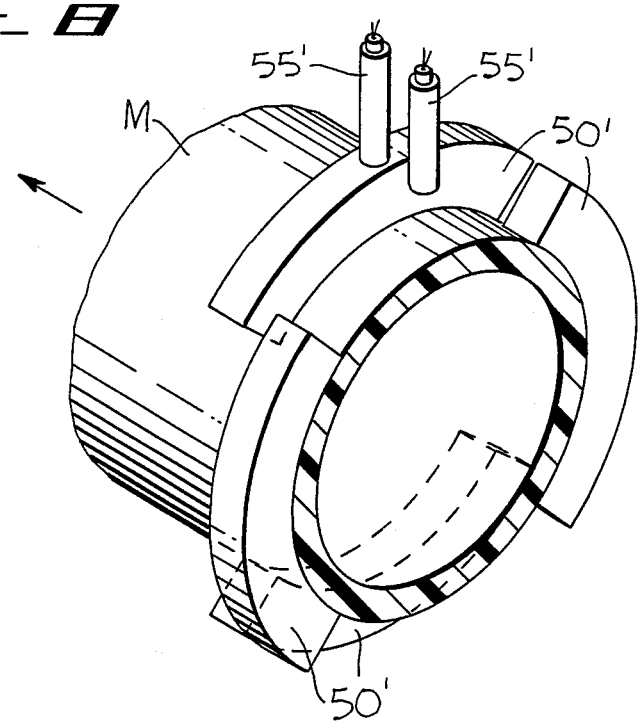
fig_8
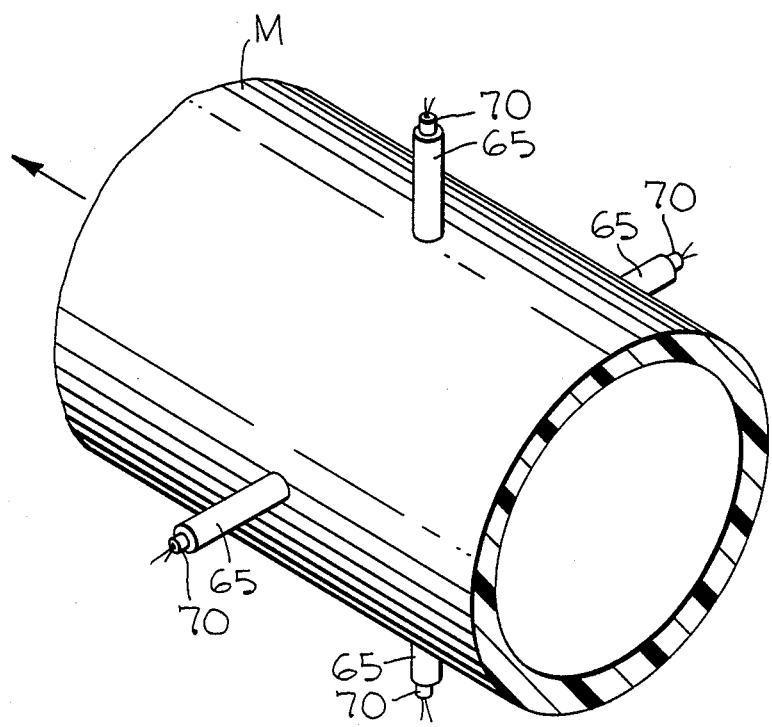
fig_9

APPARATUS FOR MEASURING AND CONTROLLING THE WALL THICKNESS OF PLASTIC PIPES

BACKGROUND OF THE INVENTION

The present invention relates in general to apparatus for producing plastic pipes, and more particularly to an apparatus for producing plastic pipes by the extrusion process in which the thickness of the plastic pipe is controlled by the takeaway speed of soft plastic pipe.

In the patent to Graves, et al., U.S. Pat. No. 4,137,025, issued on Jan. 30, 1979, for Apparatus For Measuring And Controlling The Wall Thickness Of Plastic Pipes and the patent to Graves, et al., U.S. Pat. No. 4,152,380 issued on May 1, 1979, for Method Of And Apparatus For Measuring And Controlling The Wall Thickness Of Plastic Pipes, there is disclosed an extrusion process for the manufacture of plastic pipes in which the inside diameter of the pipe and, therefore, the wall thickness of the pipe is controlled by the takeaway speed at which the molten plastic pipe is removed from the sizing sleeve. An ultrasonic transducer is disposed at the upstream end of the sizing sleeve to provide signals representative of the thickness of the molten pipe advancing in the sizing sleeve. These signals are sent to devices for comparing the measured thickness of molten plastic pipe with the desired thickness of the molten plastic pipe for producing a correction signal. The correction signal is employed for correcting the takeaway speed at which the molten plastic pipe is removed from the sizing sleeve.

In the patent to Boggs, et al., U.S. Pat. No. 3,916,676, issued on Nov. 4, 1975, for Method Of And Apparatus For Measuring Automatically Successive Sections of An Elongated Material, there is disclosed four crystal transducers spaced equal angular distances about the periphery of an advancing cable. The cable is immersed in water and the crystal transducers extend into the water. The crystal transducers are pulsed sequentially for measuring the thickness of the jacket of the cable in successive sections. In the patent to Boggs, et al., U.S. Pat. No. 3,827,287, issued on Aug. 6, 1974, for Method Of And Apparatus For Measuring The Thickness Of Successive Sections Of A Cable Jacket, there is disclosed a pulsed crystal transducer for measuring ultrasonically successive sections of a cable having a jacket for measuring the thickness of the jacket.

The patent to Saint-Amour, U.S. Pat. No. 4,520,672, issued June 4, 1985, for Thickness Measuring discloses a system for measuring the wall thickness of flexible tubing through ultrasonic techniques. Four ultrasonic probes are spaced about the tube in quadrature relation. The probes are disposed in water surrounding the flexible tube.

The patent to Livingstone, U.S. Pat. No. 4,487,072, issued on Dec. 11, 1984 for Ultrasonic Testing Of Tubular Goods discloses a test head with circumferential array of transducers oriented for flow inspection of non-rotating goods. The patent to Falgari, et al., U.S. Pat. No. 4,089,227, issued on May 16, 1978, for Apparatus For Measuring The Radial Dimensions Of A Cylindrical Tube By Ultrasonics discloses an ultrasonic transducer whose emitting part is shaped like a ring for emitting pulses to measure the radial dimensions of a tube by ultrasonics.

Krautkramer Branson Company of Lewistown, Pa., manufactured and sold an Ultrasonic Thickness Measurement System For Production Monitoring And Control (WDM-U) in which a probe transmitted a sound pulse at regular intervals through a delay medium into the piece to be tested. An interface echo and a backwall echo were returned to the probe. The transit time of the sound pulses was measured between the two pulses as the sound pulse travels through the test piece.

Panametrics Ultrasonic Thickness Gauging System (5215 Series) manufactured and sold by Panametrics, Inc. of Waltham, Massachusetts used an ultrasonic pulse-echo technique. Short duration electrical pulses were sent to a piezoelectric transducer and the transducer converted the pulses into short bursts of high frequency sound energy. The sound energy was transmitted into the test material through water and through the test material and was reflected from the inside surface of the test material. The reflected sound waves were returned to the transducer and were converted into electrical pulses.

LFE Corporation of Waltham, Massachusetts manufactured and sold the LFE System 535 for measuring and controlling the wall thickness of extruded plastic pipe lines. The system used ultrasonic sensors. For small diameter vacuum-sized pipes, four fixed probes were mounted at the sizing sleeve and were either submerged in water or operated in a spray tank. For larger diameter pressure-sized pipes, a moving probe scanned the entire circumference of a pipe by reversing direction of travel along the circumference of the pipe. The scanning probe was mounted at the sizing sleeve in a cooling tank and was either used in a spray tank or was submerged in water.

In the manufacture of plastic pipes by the extrusion process, the wall thickness of the pipe is controlled by the takeaway speed at which the plastic pipe is removed from the sizing sleeve. Sizing sleeves have been made of metal. A metal sizing sleeve presents an acoustical impedance mismatch between the plastic pipe wall and the metal sizing sleeve during the transmission of ultrasonic sound. A large impedance mismatch between the metal sizing sleeve and the plastic pipe results in substantial energy dissipation of the ultrasonic sound at the interface between the metal sizing sleeve and the plastic pipe.

In the manufacture of plastic pipes by the extrusion process, the ultrasonic sound has been generated by a transducer and transmitted to the plastic pipe through a sizing sleeve and water. The transducer and the sizing sleeve may be submerged in cooling water under vacuum in a vacuum sizing/cooling tank. Heretofore a separate vacuum cooling water system was installed for the sizing sleeve.

SUMMARY OF THE INVENTION

Apparatus for producing a hollow article by an extrusion process in which the wall thickness of the hollow article in a soft state is controlled by the takeaway speed at which a soft hollow article is removed from a sizing sleeve. To measure the wall thickness of the soft hollow article advancing through the sizing sleeve for regulating the takeaway speed, a transducer emits ultrasonic sound through a transmission line mounted on the sizing sleeve and interposed between the transducer and the soft hollow article. The time interval between the emission of a sonic pulse by the transducer and the detection of a reflected sonic pulse from the inner wall of the advancing soft hollow article is a function of the wall thickness of the soft hollow article.

A feature of the present invention is the use of a plastic transmission line mounted on or in a metallic sizing sleeve and disposed between a sound transducer and a hollow soft plastic article for acoustical impedance matching to reduce the dissipation of sound energy between the transducer and the hollow soft plastic article and to improve the accuracy of the measurement of thickness of the hollow soft plastic article advancing through the sizing sleeve and to improve the quality and power of echo signals. The transmission line may be in the form of a rod when the transducer is fixedly positioned and may be in the form of segmental sections within or on the sizing sleeve when the transducers travel about the circumference of the hollow soft plastic article. Another feature of the present invention is the use of a sizing sleeve that enables the forming of a plastic pipe with a generally constant outer diameter and with minimum defacing or marring of the finish of the plastic pipe.

Another feature of the present invention is the use of a sizing sleeve that enables cooling water under vacuum to fully circulate into the sizing sleeve, thus obviating the need of a separate water-vacuum system for the sizing sleeve.

Another feature of the present invention is that the transmission line through which the ultrasonic sound is transmitted is disposed in the sizing sleeve in the vicinity of the generation of the wall thickness of the soft hollow article being produced. Thus, the location of the measurement of the thickness of the soft hollow article being produced for correcting the takeaway speed at which the soft hollow article is removed from the sizing sleeve is at the vicinity of the generation of the wall thickness of the advancing soft hollow article. As a consequence thereof, the time lag between the generation of an error in the wall thickness of the soft hollow article and the detection of an error in the wall thickness of the soft hollow article for correction is reduced. Additionally, the measurement of the wall thickness of the soft hollow article is taken while the outer skin of the soft hollow article is more rigid, but before the remainder of the soft hollow article reaches a more rigid state.

DESCRIPTION OF THE DRAWINGS

FIG. 3 is a diagrammatic fragmentary, vertical sectional view partially in elevation of an apparatus embodying the present invention illustrated with vacuum sizing/cooling tank, sizing sleeve, rotatable transducers and segmented transmission lines disposed in respective planes along with a fragment of a plastic pipe to allow water under vacuum to circulate throughout the sizing sleeve.

FIG. 4 is a diagrammatic end view of the apparatus shown in FIG. 3 taken along line 4—4 of FIG. 3.

FIG. 5 is a diagrammatic fragmentary elevation section partially in section of an apparatus embodying the present invention illustrated with a vacuum sizing/cooling tank, a sizing sleeve, transmission line, fixedly positioned transducers along with a fragment of a plastic pipe.

FIG. 6 is an end view of the apparatus shown in FIG. 5 taken along line 6—6 of FIG. 5.

FIG. 7 is a diagrammatic illustration of ultrasonic pulses transmitted and detected by a transducer embodied in the apparatus of the present invention at various time intervals and at various locations along the path of travel of sound diagrammatically shown with a transducer, a transmission line, a sizing sleeve and a plastic pipe.

FIG. 8 is a diagrammatic generally elevational view illustrating rotatable transducers, segmented transmission lines and a fragment of a plastic pipe.

FIG. 9 is a diagrammatic generally elevational view illustrating fixedly positioned transducers, transmission lines and a fragment of a plastic pipe.

DESCRIPTION OF THE PREFERRED EMBODIMENTS

Figure 1:
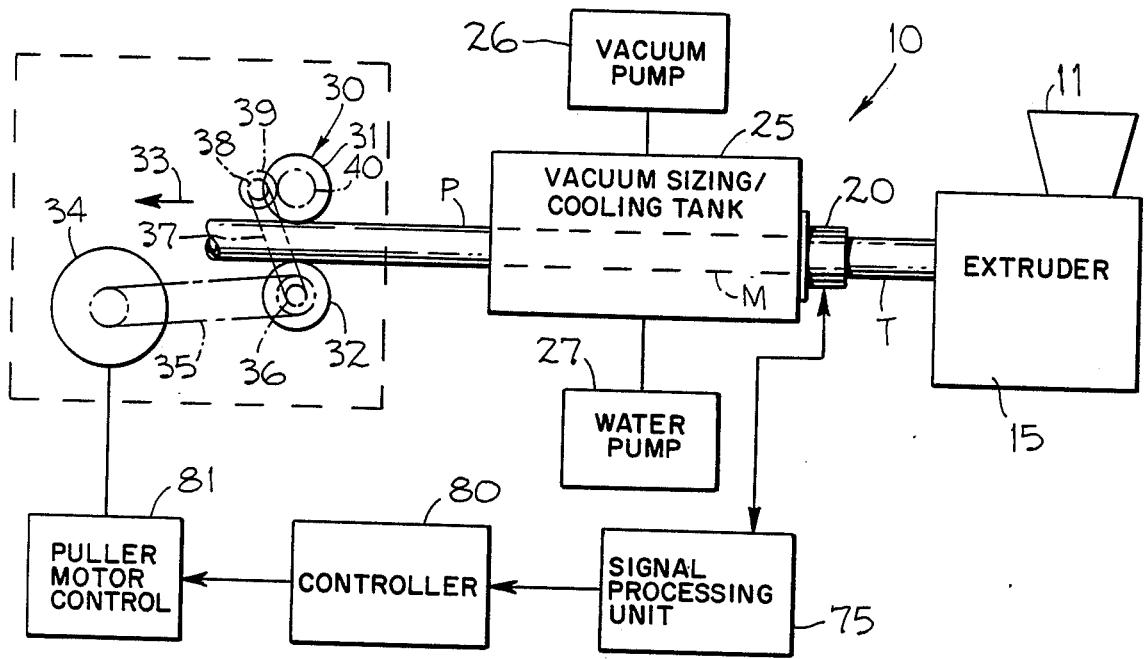
FIG. 1 is a diagrammatic illustration of apparatus embodying the present invention employed in the extrusion process for the manufacture of plastic pipes.

Illustrated in FIG. 1 is an apparatus 10 embodying the present invention employed in the extrusion process for the manufacture of a hollow article, such as a plastic pipe. The apparatus 10 comprises a hopper 11 in which a discharged well-known dry raw material for the production of plastic pipe. The hopper 11 discharges the dry raw material into a well-known multiple auger extruder 15. In a well-known manner, the extruder 15 uses one or more well-known auger-type devices, not shown, to knead and compress the raw material. External heat is applied to the extruder 15 and the combination of heat and pressure converts the dry raw material to a soft plastic material in a well-known manner.

At the discharge end of the extruder 15, the soft plastic material is forced through a well-known die, not shown, which forms a hollow tube T in a soft plastic state. The hollow tube T has the approximate dimensions of the desired end product.

After the hollow tube T is discharged from the die of the extruder 15, it is advanced into a metallic sizing sleeve 20 (FIG. 2) that is disposed on or in a conventional vacuum sizing/cooling tank 25 at the entrance or forward end thereof. The inside diameter (FIG. 2) of the sizing sleeve 20 is dimensioned to form the outside diameter desired for the finished plastic pipe P (FIG. 1) plus an allowance for shrinkage. The length of the sizing sleeve (FIG. 2) is dimensioned so that a soft plastic pipe M advancing therethrough is in a generally soft state, except for the outside skin thereof which is rigid so that the soft plastic pipe M discharged by the sizing sleeve 20 will be of a predetermined, present outside diameter.

The soft plastic pipe M advancing through the sizing sleeve 20 is urged against the inner cylindrical wall 20a of the sizing sleeve 20 by pressurizing the inside of the pipe M or by evacuating the vacuum sizing/cooling tank 25 and allowing atmospheric pressure to force the pipe M to be urged against the inner cylindrical wall of the sizing sleeve. A suitable vacuum pump 26 (FIG. 1) provides the vacuum for urging the pipe M against the inner cylindrical wall 20a of the sizing sleeve 20 by virtue of the pressure differential between the forces on the outside wall of the pipe M and the inside wall of the pipe M.

In the vacuum sizing/cooling tank 25 is chilled water. In the alternative, the vacuum sizing/cooling tank may include a well-known water spray system of conventional spray heads, not shown, discharging chilled water. The chilled water extracts heat from the hollow tube T advancing into the vacuum sizing/cooling tank 25 and the pipe M advancing through the sizing sleeve 20. Fresh cooling water is continuously introduced into the vacuum sizing/cooling tank 25, while water heated by the cooling process is removed by means of a suitable pump 27. When the pipe M exits from the vacuum sizing/cooling tank 25 it is in the form of a rigid plastic pipe P (FIG. 1). #For purposes of clarity, the hollow tube T advances into the vacuum sizing/cooling tank 25 to be formed in the soft plastic pipe M and when the soft plastic pipe exits from the vacuum sizing/cooling tank 25, it is in the form of a rigid pipe P. For advancing the plastic pipe in its formation sequence through the sizing sleeve 20 and through the cooling tank 25, the rigid plastic pipe P is gripped and advanced by suitable takeaway means (FIG. 1). In the exemplary embodiment, the takeaway means 30 comprises rollers 31 and 32, which grip the rigid plastic pipe P and advance the rigid plastic pipe P in the direction of an arrow (FIG. 1). A suitable drive motor 34, such as a d.c. drive motor, imparts rotation to a drive belt 35. The drive belt 35, in turn, rotates a sheave 36. The sheave 36 is fixed to a common shaft with the roller 32 so that the sheave 36 imparts rotation to the roller 32. The sheave 36 also drives a drive belt 37, which, in turn, imparts rotation to a sheave 38. Fixed to the shaft of the sheave for rotation therewith is a gear 39, which meshes with a gear 40 to impart rotation to the roller 31. The rollers 31 and 32 advance the rigid pipe P in the direction of the arrow 33.

The inside diameter of the pipe P, and, hence, the wall thickness of the pipe P, is controlled by the speed at which the pipe M is removed from the sizing sleeve 20. Since the extruder 15 is discharging the hollow tube T at a constant rate and since the outside diameter of the pipe M, which is advancing through the sizing sleeve 20, is determined by the inside diameter of the sizing sleeve 20, the inside diameter of the pipe M is determined by the rate at which the pipe M is removed from the sizing sleeve by the takeaway means 30. The faster the rate of removal of the pipe M from the sizing sleeve 20 by the takeaway means 30, the thinner will be the wall thickness of the rigid plastic pipe P. Conversely, the slower the rate of removal of the pipe M from the sizing sleeve 20 by the takeaway means 30, the greater will be the wall thickness of the pipe P.

In the exemplary embodiment, the rate at which the takeaway means removes the pipe M from the sizing sleeve 20 is controlled by the speed of operation of the d.c. motor 34. In the preferred embodiment, the thickness of the pipe M is measured while the pipe M is advancing through the sizing sleeve 20 for the forming of the inner wall of the pipe M. Hence, the correction of the takeaway speed for controlling the thickness of the plastic pipe P is made substantially while the soft plastic pipe M is being measured for the wall thickness thereof or in a very short time interval thereafter.

In one embodiment of the present invention, the metallic sizing sleeve 20 (FIG. 2) comprises an annular flange 20b, which is secured to the forward wall 25a of the vacuum sizing/cooling tank 25 by suitable means, such as nuts and bolts. The nuts and bolts are spaced equal angular distances apart and positioned equal radial distances from a common axis. Integrally formed with the annular flange 20b at the inner end thereof is an outer hollow or cylindrical wall 20c. Spaced radially inward from the outer cylindrical wall 20c is the inner hollow or cylindrical wall 20a. An annular disc 20d is integrally formed with the forward ends of the cylindrical walls 20c and 20a. The inner cylindrical wall 20a is concentric with the outer cylindrical wall 20c. The annular flange 20b is radially disposed relative to the cylindrical wall 20c and the inner cylindrical wall 20a.

Formed along the inner surface of the inner wall 20a are grooves 45. Radially disposed holes 46 extend through the inner cylindrical wall 20a. The grooves 45 and the holes 46 serve to provide paths through which cooling water travels to contact the outer diameter of the pipe M to provide a cooling action and lubricating action. As a consequence thereof, the pipe M slides along the inner surface of the inner cylindrical wall 20a and reduces the tendency of marking the outer wall of the soft plastic pipe M as it cools. The holes 46 also function to assure the forces applied by the atmospheric pressure on the inner wall of the soft plastic pipe M are greater than the forces applied to the outer wall of the soft plastic pipe M to cause the pipe M to be continuously urged against the inner surface of the inner wall 20a of the sizing sleeve 20.

The above arrangement enables a plastic pipe P to be formed with a generally constant outer diameter and with minimum defacing or marring of the finish of the plastic pipe P. Cooling water under vacuum freely circulates between the inner cylindrical wall 20a and the outer cylindrical wall 20c of the sizing sleeve 20.

Figure 2:
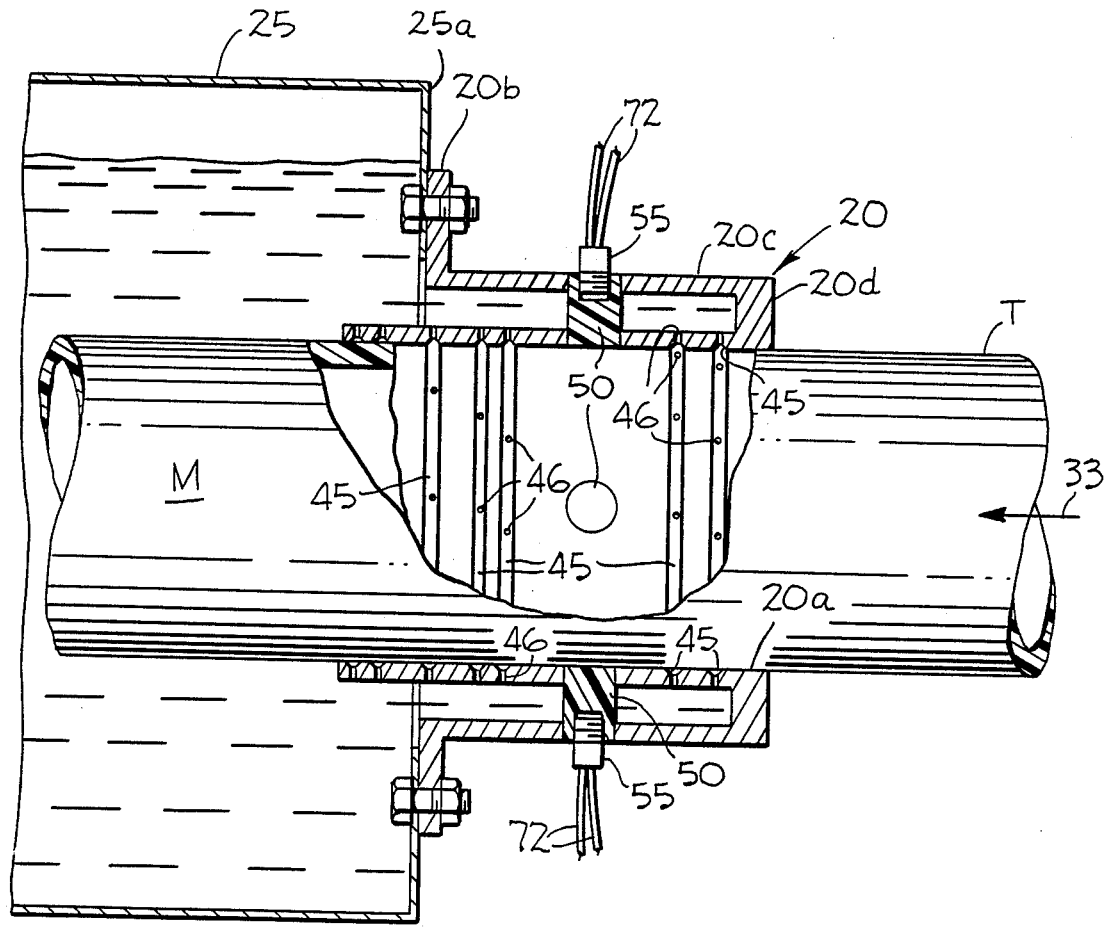
FIG. 2 is a diagrammatic fragmentary, vertical sectional view partially in elevation of an apparatus embodying the present invention illustrated with vacuum sizing/cooling tank, a sizing sleeve, transmission line, and stationary transducers along with a fragment of a plastic pipe.

Mounted within the sizing sleeve 20 and extending between the inner surface of the inner wall 20a and in the vicinity of the outer surface of the outer wall 20b are spaced apart, sound transmission lines 50 (FIG. 2). In the preferred embodiment, the sound transmission lines 50 are made of a non-metallic material, such as plastic material. In the preferred embodiment, the plastic material is VESPEL manufactured by DuPont Corporation or TORLON manufactured by AMOCO. VESPEL is a polyimide resin and TORLON is a poly(amide-imide) resin.

The sound transmission lines made of VESPEL and TORLON material have been found to have a low acoustic impedance. The velocity of sound through the plastic transmission lines 50 is generally equivalent to the velocity of sound through the soft plastic pipe M for impedance matching. Thus, the transmission ines 50 have the capacity to withstand the high temperatures of the soft plastic pipe M without breaking down and also have good wear resistance for avoiding the defacement of the plastic pipe P.

While reference is made herein to transmission lines 50, it is common for one skilled in the art to refer to the elements 50 as delay lines.

Radially disposed relative to the axis of the sizing sleeve 20 and spaced from the axis of the sizing sleeve 20 for engaging the transmission lines 50 respectively are transducers 55, such as ultrasonic piezoelectric transducers. In one embodiment of the present invention, the transducers 55 (FIG. 2) are stationary and are secured to the transmission lines 50 in a suitable manner, such as threaded engagement. The transducers 55, in the exemplary embodiment, are manufactured and sold by Krautkramer Branson of Lewiston, Pa., Aerotech Fingertip with removable delay line, style DFR.

In another embodiment of the present invention, there are stationary, segmental, spaced apart sound transmission lines 50′ (FIGS. 3, 4 and 8). The sound transmission line segments 50' are mounted within a sizing sleeve 20' and are disposed in two planes and are generally quadrantly spaced from one another with a relatively small overlap to allow the water under vacuum to freely circulate within the sizing sleeve 20'. In the exemplary embodiment, there are four radially disposed arcuate transmission line segments 50' with two segments in a first plane and two segments in a second plane with the first and second planes located generally adjacent one another while leaving sufficient space therebetween for the free circulation of water. The transmission line segments 50' are made of material similar to the material of which the transmission lines 50 are made and function in a similar manner.

The central axis about which the transmission line segments 50' are disposed is coextensive with the axes of the inner cylindrical wall 20a' and the outer cylindrical wall 20c'. Radially disposed relative to the axis of the sizing sleeve 20' and axially spaced relative to the sizing sleeve 20' for movement in close proximity to the transmission line segments 50' in respective planes are a set of transducers 55', such as ultrasonic piezoelectric transducers. In the exemplary embodiment, the transducers 55' are manufactured and sold by Krautkramer Branson of Lewiston, Pa., AEROTECH style IPS of the Gamma Series. In the preferred embodiment, there are two transducers 55'.

For mounting the transducers 55' for movement in the proximity to their associated transmission line segments 50' is a suitable annular shoe 56. (FIG. 3). The annular shoe 56 is disposed about the cylindrical wall 20c' of the sizing sleeve 20'. The shoe 56 is rotatable about the cylindrical wall 20c'. Suitable retaining means, not shown, retain the shoe 56 against excessive axial displacement relative to the axis of the sizing sleeve 20'. Formed in the shoe 56 are radially disposed openings 57 in which are disposed the transducers 55', respectively.

The transducers 55' through a cycle of rotation successively and sequentially move in close proximity to the stationary transmission line segments 50'. Fixed to the annular shoe 56 for imparting rotation thereto is a ring gear 60 (FIGS. 3 and 4). For rotating the ring gear 60 and the transducers 55' about the axis of the sizing sleeve 20' in alternate clockwise and counter-clockwise directions is a suitable drive gear 61. The drive gear 61 is arranged to mesh with the ring gear 60 to impart rotation to the ring gear 60 and the transducers 55'. The drive gear 61 imparts rotation to the ring gear 60 so that the transducers 55' scan over the entire cylindrical wall of the pipe M for 360° during the clockwise and counterclockwise cycle. A drive belt 62 (FIG. 4) interconnects a drive motor 64 with the drive gear 61 for imparting rotation thereto.

In another embodiment of the present invention which is similar to the embodiment shown in FIG. 2, sound transmission lines 65 (FIGS. 5, 6 and 9), such as non-metallic or plastic sound transmission lines, are mounted within the sizing sleeve 20 and extend between the inner surface of the inner wall 20a and the outer surface of the outer wall 20b of the sizing sleeve 20. In the exemplary embodiment, there are four transmission lines 65 disposed in quadrature. The sound transmission lines 65, in the preferred embodiment, have cylindrical configurations. The central axis about which the transmission lines 65 are disposed is coextensive with the axes of the inner cylindrical wall 20a and the outer cylindrical wall 20c of the sizing sleeve 20. The axis of each cylindrical transmission line 65 is radially disposed relative to the axes of the inner cylindrical wall 20a and the outer cylindrical wall 20c. In the preferred embodiment, the sound transmission lines 65 are made of non-metallic material or plastic, such as VESPEL, manufactured by DuPont Corporation or TORLON, manufactured by AMOCO.

Formed in each transmission line 65 (FIGS. 5 and 6) is a threaded, axially disposed, cylindrical opening. Disposed in the threaded openings, respectively, in threaded engagement with the transmission lines 65 are transducers 70, such as ultrasonic piezoelectric transducers. The transducers 70 are fixedly secured by threaded engagement with the axes of the transmission lines 65, respectively. In the exemplary embodiment, there are four piezoelectric transducers 70 radially disposed in quadrature relation. Each transducer 70 is radially aligned and in contact with a respective transmission line 65. It is within the contemplation of the present invention, the transducers 70 may be slipped in type as well as being threaded.

In the exemplary embodiment, the ultrasonic, piezoelectric transducers 70 are of the type manufactured and sold by Krautkramer Branson of Lewiston, Pa., Aerotech Fingertip with removable delay line, style DFR. Sound pulses produced by the previously disclosed transducers 50 are transmitted and reflected back through the associated transmission lines 50. Similarly, sound pulses produced by the transducers 70 are transmitted and reflected back through the associated transmission lines 65.

The transmission lines 50 and 65, which are preferably cylindrically shaped, are disposed in intimate contact with the outer surface of the soft plastic pipe M advancing through the sizing sleeve 20 to enable cooling water under vacuum in the vacuum sizing/cooling tank 25 to freely circulate into the sizing sleeve 20. As a result thereof, the need of a separate vacuum cooling water system for the sizing sleeve 20 has been obviated.

A fluid couplant, such as EXOSEN couplant manufactured by Krautkramer Branson of Lewiston, Pa., is placed between transducers, such as the transducers 55 and 70, before the transducers 55 and 70 are screwed in or placed into the transmission lines 50 and 65 to assure that sound pulses do not travel through air. In the case of the rotating transducers, the couplant is a steady stream of water, i.e. tap water, running through the hose 57' and through the suitable hole 58 to a cavity formed in the shoe 56. A film of water is always present between the transducers 55' and the transmission line segments 50'.

In the preferred embodiment, the transmission lines 65 and 50 have grooves or 60 degree V-grooves 65', 0.006 to 0.008 inches deep and spaced approximately 40 grooves per inch on their outer diameters (FIG. 5). The grooves 65' reduce the tendency for sonic waves to be reflected by the outer diameter of the transmission lines, thereby causing noise at the signal processing unit 75.

In practice, the stationary or fixedly positioned transducer arrangement is employed when plastic pipes of relatively small outer diameter are produced, i.e. ½ inch outer diameter to 4 inches outer diameter. On the other hand, the rotatable transducer arrangement is employed when plastic pipes of relatively large diameters are produced, i.e. outer diameters in excess of 4 inches.

In operation, the transducer 55 (FIG. 2) transmits a sonic or a supersonic pulse A (FIG. 7) at a time $T_1$ through the transmission line 50 and through the soft plastic pipe M. The sonic energy is returned or echos back to the transducer 55 to be detected as a pulse B at a time $T_2$ (FIG. 7). The pulse B is sonic energy reflected from the near end of the transmission line 50. A second pulse of sonic energy will be reflected and returned to the transducer 55 for detection as echo C at a time $T_3$. The echo C is generated at the outer wall of the soft plastic pipe M. A third echo of sonic energy will be reflected and returned to the transducer 55 for detection as echo D at a time $T_4$. The echo D is reflected from the inner wall of the soft plastic pipe M.

The time interval between the emission of the source pulse by the transducer 55 and the detection of the reflected echo pulse from the inner diameter of the soft plastic pipe M by the transducer 55 is a function of the wall thickness of the soft plastic pipe M and the sonic velocity of the material through which the sonic pulse travels. Measurement is taken of the time it takes for sonic energy to travel between the near and far wall of the pipe M.

Each transducer 55 (FIG. 2) transmits a sonic or supersonic pulse A (FIG. 7) at a time $T_1$ through its associated transmission line 50 and through the soft plastic pipe M. The sonic energy is returned to the transducer 55 to be detected as a pulse at a time $T_2$. The pulse B is sound energy reflected from the adjacent end of the associated transmission line 50. A second pulse of sonic energy will be reflected and returned to the transducer 55 for detection as a pulse C at a time $T_3$. The pulse C is reflected from the outer wall of the soft plastic pipe M through the associated transmission line 55. A third pulse of sonic energy will be reflected and returned to the transducer 55 for detection as pulse D at a time $T_4$ through the associated transmission line 55. The pulse D is reflected from the inner wall of the soft plastic pipe M. The time interval between $T_3$ and $T_4$ (FIG. 7) represents the wall thickness of the soft plastic pipe M substantially at the time of the formation of the inner wall of the soft plastic pipe M.

The transducer 55 transmits electrical signals over conductors 72 representative of time intervals between emitted pulses and detected pulses to a well-known signal processing unit 75 (FIG. 1). The wall thickness of the pipe M is determined by the time interval between echos $T_3$ and $T_4$ times the known sound velocity of plastic pipes.

The signal processing unit 75 may be of the type manufactured and sold by LFE Corporation of Waltham, Mass. as the LFE System 535 console. The transducer generated electrical pulses are applied to the signal processing unit 75 successively and sequentially, and are representative of the time intervals between reflected sound pulses detected by the transducer. The electrical pulses are multiplexed and interrogated one at a time. The results of the readings are stored and averaged. The output signal of the signal processing unit 75 is applied to a suitable controller 80 such as the ACP-105 controller manufactured and sold by LFE Corporation for adjusting a conventional motor control to regulate the takeaway speed of the motor 34.

The signal processing unit 75 may be the Model 5215 Ultrasonic Gauge manufactured and sold by Panametrics, Inc. of Waltham, Mass. An electrical pulse is applied to a piezoelectric transducer by the signal processing unit 75 and the transducer applied electrical pulses derived from reflected sound pulses to the signal processing unit. The procedure is multiplexed for each transducer step at a selectable rate. The Panametrics 5215 Ultrasonic Gauge operates on the pulse-echo principle. It excites a piezoelectric transducer for a short time duration by an electrical pulse. The transducer converts the electrical energy into sound energy. The sound energy is applied to a soft plastic pipe. The sound energy travels through the wall of the soft plastic pipe and is reflected back to the transducer emitted from the sound energy. The same transducer converts the reflected sound energy into electrical pulses. The electrical pulses representing the reflected sound waves are applied to the Panametrics 5215 Ultrasonic Gauge.

The 5215 Ultrasonic Gauge selects from the returned pulses the appropriate echo signals that will be used in the time-interval measurement. The time-interval is measured and the time-interval is electronically multiplied by the material velocity factor. The signal representing the thickness correction factor is applied to the controller 80, which, in turn, regulates the motor control 81. The motor control 81, in turn, adjusts the takeaway speed of the motor 34 to compensate for the error in wall thickness of the soft plastic pipe M.

The present invention is concerned with the method of transmitting ultrasonic signals through a sizing sleeve. The specific form or arrangement of circuitry in the controller 80 is not a part of the invention. The controller may involve a microprocessor which would compare signals received from the signal processing unit 75 with prescribed limits set into the controller with a keyboard. When the measured thickness exceeds the preset limits the controller would cause the puller motor control 81 to either speed up or slow down the puller motor 34. A microprocessor based controller 80 can manipulate the signals received from the signal processing unit in any number of ways to control the wall thickness of the extruded plastic pipe by controlling the speed of the rollers 31 and 30. A simple on-off system would either speed up or slow down the rollers a very small preset amount and then interject a time delay before allowing another correction to be made in order to allow the extrusion system to "settle down". This would ensure that any thickness measurements made represent a stable extrusion line condition rather than a transient line condition.

The controller might also average signals received from the signal processing unit 75 and compare them with preset standards at preset time intervals. A system of this general type may be utilized with the rotating transducer arrangement shown in FIGS. 3 and 4.

I claim:

1. A sizing sleeve assembly for apparatus producing a hollow article in which the wall thickness of the hollow article is measured comprising:
   (a) sizing sleeve having an inner cylindrical hollow wall through which advances a hollow article, said inner hollow wall being engaged by said hollow article for forming an outer wall surface for said hollow article, said sizing sleeve having an outer hollow wall surrounding said inner hollow wall in spaced relation thereto, said inner and outer hollow walls being joined at one of their ends by a generally annular disc for forming a chamber between said inner and outer hollow walls;
   (b) a sound transmission line mounted in said chamber between said inner and outer hollow walls of said sizing sleeve; and
   (c) a transducer disposed adjacent to and outboard of said outer hollow wall of said sizing sleeve for transmitting sound energy through said sound transmission line and through the wall of said hollow article and for receiving sound energy reflected from the wall of said hollow article through said sound transmission line for the measurement of the wall thickness of said hollow article.

2. A sizing sleeve assembly as claimed in claim 1 wherein said sound transmission line is formed with grooves along an outer wall thereof to reduce the tendency for sound to be reflected along said outer wall.

3. A sizing sleeve assembly as claimed in claim 1 wherein said sound transmisison line is disposed contiguous to the outer wall surface of said hollow article advancing through said sizing sleeve.

4. A sizing sleeve assembly as claimed in claim 3 wherein said transmission line is made of said, non-metallic material.

5. A sizing sleeve assembly as claimed in claim 3 wherein said hollow article is made of plastic, said sizing sleeve is made of solid, metallic material and said sound transmission line is made of non-metallic material.

6. A sizing sleeve assembly as claimed in claim 3 wherein said transducer is fixedly positioned by securement to said sound transmission line.

7. A sizing sleeve assembly as claimed in claim 3 wherein said hollow article is made of plastic and said sound transmission line is made of plastic.

8. A sizing sleeve assembly as claimed in claim 7 wherein said plastic is a polyimide resin.

9. A sizing sleeve assembly as claimed in claim 3 wherein said transducer is adjacent to said sound trnasmission line at the end thereof opposite from the end of said sound transmission line contiguous to the outer wall surface of said hollow article.

10. A sizing sleeve assembly as claimed in claim 9 wherein said transducer is removably secured by threaded engagement to said sound transmission line.

11. A sizing sleeve assembly as claimed in claim 9 wherein said outer hollow wall has a cylindrical outer surface, said sizing sleeve assembly comprising means for imparting rotatable movement to said transducer about said cylindrical outer surface of said outer hollow wall.

12. A sizing sleeve assembly as claimed in claim 11 and comprising a plurality of said transmission lines arranged in the form of angularly spaced arcuate segements disposed in a plurality of plane axially spaced relative to said cylindrical surface of said outer hollow wall.

13. Apparatus for producing a hollow article comprising:
(a) an extruder for forming a hollow article in a soft state;
(b) a cooling tank disposed downstream of said extruder for receiving said hollow article in a soft state advancing beyond said extruder for forming a soft hollow article;
(c) a sizing sleeve associated with said cooling tank at the forward end thereof for receiving said soft hollow article, said sizing sleeve having an inner cylindrical hollow wall through which advances the soft hollow article, said inner hollow wall being engaged by said soft hollwo article for forming an outer wall surface for said soft hollow article, said sizing sleeve having an outer hollow wall surrounding said inner cylindrical hollow wall in spaced relation thereto, said inner and outer hollow walls being joined at one of their ends by a generally annular disc for forming a chamber between said inner and outer hollow walls;
(d) a sound transmission line mounted in said chamber between said inner and outer hollow walls of said sizing sleeve;
(e) a transducer disposed adjacent to and outboard of said outer hollow wall of said sizing sleeve for transmitting sound energy through said sound transmission line and through the wall of said soft hollow article and for receiving sound energy reflected from the wall of said soft hollow article through said transmission line for the measurement of the wall thickness of said soft hollow article, said transducer producing time-interval electrical signals representative of the wall thickness of said soft hollow article;
(f) takeaway means gripping said hollow article for advancing said hollow article downstream of said sizing sleeve in the formation of a rigid hollow article; and
(g) control means responsive to said time-interval electrical signals produced by said transducer for controlling the operation of said takeaway means to adjust the speed at which said takeaway means advances said soft hollow article from said sizing sleeve for forming a rigid hollow article of a prescribed wall thickness.

14. Apparatus for producing a hollow article as claimed in claim 13 wherein said transmission line is made of solid, non-metallic material.

15. Apparatus for producing a hollow article as claimed in claim 13 wherein said hollow article is made of plastic, said sizing sleeve is made of metallic material and said sound transmission line is made of solid, non-metallic material.

16. Apparatus as claimed in claim 13 wherein said sound transmission line is formed with grooves along an outer wall thereof to reduce the tendency for sound to be reflected along said outer wall.

17. Apparatus for producing a hollow article as claimed in claim 13 wherein said sound transmisison lines are disposed contiguous to the outer wall surface of said hollow article advancing through said sizing sleeve.

18. Apparatus for producing a hollow article as claimed in claim 17 wherein said transducer is disposed adjacent to said sound transmission line at the end thereof apposite from the end of said sound transmisison line contiguous to the outer wall surface of said hollow article.

19. Apparatus for producing a hollow article as claimed in claim 18 wherein said transducer is removably secured by threaded engagement with said sound transmission line.

20. Apparatus as claimed in claim 18 whrein said outer hollow wall has a cylindrical outer surface, said apparatus comprising means for rotating said transducer about said cylindrical outer surface of said outer hollow wall.

21. Apparatus as claimed in claim 20 and comprising a plurality of said sound transmission lines arranged in the form of angularly spaced arcuate segments disposed in a plurality of planes axially spaced relative to said cylindrical surface of said outer hollow wall.

22. Apparatus as claimed in claim 17 wherein said hollow article is made of plastic and said sound transmission line is made of plastic.

23. Apparatus as claimed in claim 22 wherein said transducer is fixedly positioned by securement to said sound transmission line.

24. Apparatus for producing a hollow article as claimed in claim 13 wherein said hollow article is made of plastic and said sound transmission line is made of plastic.

25. Apparatus for producing a hollow article as claimed in claim 24 wherein said plastic is a polyimide resin.

26. Apparatus for producing a hollow article as claimed in claim 24 wherein said control means compares the signals representative of the wall thickness measurement of the soft hollow article with signals representative of a desired wall thickness for the soft hollow article for correcting the speed at which the takeaway means removes the soft hollow article from said sizing sleeve.

* * * * *